US012072062B2

(12) United States Patent
Dufaure et al.

(10) Patent No.: US 12,072,062 B2
(45) Date of Patent: Aug. 27, 2024

(54) MULTILAYER STRUCTURE FOR TRANSPORTING OR STORING HYDROGEN

(71) Applicant: Arkema France, Colombes (FR)

(72) Inventors: Nicolas Dufaure, Serquigny (FR); Patrick Dang, Serquigny (FR); Antoine Goupil, Seoul (KR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/620,363

(22) PCT Filed: Jan. 26, 2021

(86) PCT No.: PCT/FR2021/050141
§ 371 (c)(1),
(2) Date: Dec. 17, 2021

(87) PCT Pub. No.: WO2021/152255
PCT Pub. Date: Aug. 5, 2021

(65) Prior Publication Data
US 2022/0364678 A1 Nov. 17, 2022

(30) Foreign Application Priority Data
Jan. 28, 2020 (FR) ...................................... 2000818

(51) Int. Cl.
*F17C 1/16* (2006.01)
*B32B 27/08* (2006.01)
*B32B 27/12* (2006.01)
*B32B 27/22* (2006.01)
*B32B 27/34* (2006.01)
*B32B 27/38* (2006.01)
*F17C 1/02* (2006.01)

(52) U.S. Cl.
CPC .............. *F17C 1/16* (2013.01); *B32B 27/08* (2013.01); *B32B 27/12* (2013.01); *B32B 27/22* (2013.01); *B32B 27/34* (2013.01); *B32B 27/38* (2013.01); *F17C 1/02* (2013.01); *B32B 2250/02* (2013.01); *B32B 2250/03* (2013.01); *B32B 2260/046* (2013.01); *B32B 2262/101* (2013.01); *B32B 2307/7242* (2013.01); *B32B 2363/00* (2013.01); *B32B 2377/00* (2013.01); *F17C 2203/066* (2013.01); *F17C 2221/012* (2013.01); *F17C 2270/0178* (2013.01)

(58) Field of Classification Search
CPC ...... F17C 1/06; F17C 1/04; F17C 1/02; F17C 1/16; F17C 2221/012; F17C 2221/011; F17C 2203/066; F17C 2203/0658; F17C 2203/0634; B32B 27/08; B32B 27/12; B32B 27/22; B32B 27/34; B32B 27/38

USPC ............... 220/589, 588, 586, 62.19, 560.04; 428/902, 36.4, 36.3; 206/0.7, 0.6
See application file for complete search history.

(56) References Cited

U.S. PATENT DOCUMENTS

| 5,526,994 | A | * | 6/1996 | Murphy | ............... B29C 53/602 242/437.3 |
| 2008/0241562 | A1 | | 10/2008 | Bushelman et al. | |
| 2011/0056960 | A1 | | 3/2011 | Blanc et al. | |
| 2014/0008373 | A1 | | 1/2014 | Sharp et al. | |
| 2019/0149600 | A1 | | 5/2019 | Duan et al. | |
| 2021/0229404 | A1 | * | 7/2021 | Miyabe | ............... B65D 1/0215 |

FOREIGN PATENT DOCUMENTS

| BR | 8400030 A * | 8/1984 | .......... B29C 61/006 |
| CA | 2044527 C * | 3/2000 | .......... B32B 27/065 |
| CA | 2678979 A1 * | 8/2008 | ......... B29C 44/1228 |
| EP | 0722961 A1 | 7/1996 | |
| FR | 2923575 A1 | 5/2009 | |
| WO | WO-2010132335 A1 * | 11/2010 | ............. B29C 70/00 |
| WO | 2018155491 A1 | 8/2018 | |

OTHER PUBLICATIONS

Translation of FR2923575A1. Claude et al., May 15, 2009, Paragraphs 20, 29, and 48 (Year: 2009).*
Translation of CA2044527, Vuachet, Mar. 28, 2000, (Year: 2000).*
Translation of BR8400030A, Pithouse et al., Aug. 14, 1984 (Year: 1984).*
International Search Report (PCT/ISA/210) with translation and Written Opinion (PCT/ISA/237) mailed on May 14, 2021, by the France Patent Office as the International Searching Authority for International Application No. PCT/FR2021/050141.
Galassi, M.C., et al., "Onboard compressed hydrogen storage: Fast filling experiments and simulations", Energy Procedia, 2012, 29, pp. 192-200.

* cited by examiner

*Primary Examiner* — Robert J Hicks
(74) *Attorney, Agent, or Firm* — Boone IP Law

(57) ABSTRACT

A multilayer structure for transporting, distributing and storing hydrogen including, from the inside to the outside, a sealing layer and at least one composite reinforcement layer, the sealing layer including from the inside to the outside: a layer of a composition including: a short-chain polyamide thermoplastic polymer, more than 15% and up to 50% by weight of impact modifier, or including: a semi-crystalline long-chain polyamide thermoplastic polymer, up to 50% by weight of impact modifier, up to 3% by weight of plasticizer; a hydrogen barrier layer; a layer of a composition including: a short-chain polyamide thermoplastic polymer, more than 15% and up to 50% by weight of impact modifier, or including: a semi-crystalline long-chain polyamide thermoplastic polymer, up to 50% by weight of impact modifier, up to 3% of weight of plasticizer, the innermost composite reinforcement layer being wound around the sealing layer.

15 Claims, No Drawings

MULTILAYER STRUCTURE FOR TRANSPORTING OR STORING HYDROGEN

TECHNICAL FIELD

The present patent application relates to multilayer composite structures for transporting, distributing, or storing hydrogen, in particular for distributing or storing hydrogen, and the method for producing same.

PRIOR ART

Hydrogen tanks are currently attracting a lot of attention from numerous manufacturers, especially in the automotive sector. One of the goals sought is to propose increasingly fewer polluting vehicles. Thus, electric or hybrid vehicles comprising a battery aim to progressively replace combustion engine vehicles such as either gas or diesel vehicles. It has turned out that the battery is a relatively complex vehicle component. Depending on the positioning of the battery in the vehicle, it may be necessary to protect it from impact and from the outside environment, which can have extreme temperatures and variable humidity. It is also necessary to avoid any risk of flames.

Additionally, it is important that the operating temperature thereof not exceed 55° C. in order to not break down the cells of the battery and to preserve the life thereof. Conversely, for example in winter, it may be necessary to increase the battery temperature so as to optimize operation thereof.

Moreover, electric vehicles still suffer today from several problems, namely battery range, the use in these batteries of rare earth metals, the resources for which are not infinite, much longer recharging times than the length of time taken to fill a tank, as well as a problem of electricity production in various countries in order to be able to recharge the batteries.

Hydrogen is therefore an alternative to the electric battery, since hydrogen can be converted into electricity by means of a fuel cell and thus power electric vehicles.

Hydrogen tanks usually consist of a metallic liner (or sealing layer) that must prevent hydrogen from permeating out. One of the types of tank envisaged, referred to as Type IV, is based on a thermoplastic liner around which a composite is wound.

Their basic principle is to separate the two essential functions of sealing and mechanical strength and manage them independently of each other. In this type of tank, the liner (or sealing sheath) made of thermoplastic resin is combined with a reinforcement structure consisting of fibers (glass, aramid, carbon), also known as a reinforcement sheath or layer, which make it possible to operate at much higher pressures while reducing weight and avoiding risks of explosive rupture in the event of severe external attacks.

Liners must have certain fundamental characteristics:

The possibility to be transformed by extrusion blow molding, rotational molding, injection molding or extrusion Low permeability to hydrogen, indeed, the permeability of the liner is a key factor in limiting hydrogen losses from the tank;

Good mechanical properties (fatigue) at low temperatures (−40 to −70° C.);

Thermal resistance at 120° C.

Indeed, it is necessary to increase the filling speed of the hydrogen tank, which should be roughly equivalent to that of a fuel tank for an internal combustion engine (about 3 to 5 minutes), but this increase in speed causes more significant heating of the tank, which then reaches a temperature of about 100° C.

The assessment of the performance and safety of hydrogen tanks can be determined in a reference European laboratory (GasTeF: hydrogen tank testing facility), as described in Galassi et al. (World hydrogen energy conference 2012, Onboard compressed hydrogen storage: fast filing experiments and simulations, Energy Procedia 29, (2012) 192-200).

The first generation of type IV tanks used a liner based on high-density polyethylene (HDPE).

However, HDPE has the disadvantage of having too low a melting point and high permeability to hydrogen, which represents a problem with new requirements in terms of thermal resistance and does not make it possible to increase the filling speed of the tank.

Liners based on polyamide PA6 have been in development for a number of years.

Nonetheless, PA6 has the disadvantage of having a low resistance to cold.

Application US2014/008373 describes a light storage cylinder for a high-pressure compressed gas, the cylinder having a liner surrounded by a constraining layer, the line comprising:
a first inner layer of impact-modified polyamide (PA) in contact with the gas,
a thermoplastic outer layer in contact with the constraining layer; and
an adhesive binding layer between the first impact-modified PA inner layer and the outer thermoplastic layer.

French application FR2923575 describes a tank for storing fluid under high pressure comprising, at each end thereof along the axis thereof, a metallic end piece, a liner surrounding said end pieces, and a structural layer made of fiber impregnated with thermoset resin surrounding said liner.

WO18155491 describes a hydrogen transport component having a three-layer structure, the inner layer of which is a composition consisting of PA11, from 15 to 50% of an impact modifier and from 1 to 3% of plasticizer, or devoid of plasticizer, which has hydrogen barrier properties, good flexibility and durability at low temperature. However, this structure is suitable for pipes for transporting hydrogen but not for the storage of hydrogen.

Thus, there is still a need to optimize, on the one hand, the matrix of the composite so as to optimize its mechanical strength at high temperature and, on the other hand, the material composing the sealing sheath, so as to optimize its operating temperature. Thus, the optional modification of the composition of the material composing the sealing liner which will be carried out must not result in a significant increase in the manufacturing temperature (extrusion blow molding, injection molding, rotational molding, etc.) of this liner compared to what is practiced today.

These problems are solved by providing a multilayer structure of the present invention intended for transporting, distributing or storing hydrogen Throughout this description, the terms "liner" and "sealing sheath" have the same meaning.

The present invention therefore relates to a multilayer structure intended for transporting, distributing and storing hydrogen, in particular for storing hydrogen, comprising, from the inside to the outside, a sealing layer (1) and at least one composite reinforcement layer (2), said sealing layer comprising, from the inside to the outside:
a layer (a) consisting of a composition predominantly comprising:

a short-chain polyamide thermoplastic polymer, the Tm of which, as measured according to ISO 11357-3: 2013, is greater than 160° C., in particular greater than 170° C., more than 15% and up to 50% of impact modifier,
or predominantly comprising:
a long-chain semi-crystalline polyamide thermoplastic polymer, the Tm of which, as measured according to ISO 11357-3: 2013, is greater than 160° C., in particular greater than 170° C.,
up to 50% by weight of impact modifier, especially up to less than 15% by weight of impact modifier, in particular up to 12% by weight of impact modifier relative to the total weight of the composition,
up to 3% by weight of plasticizer relative to the total weight of the composition; optionally a layer of binder;
a hydrogen barrier layer, in particular made of a fluoropolymer, in particular of PVDF, or of EVOH, preferably of EVOH;
optionally a layer of binder;
a layer (b) consisting of a composition predominantly comprising:
a short-chain polyamide thermoplastic polymer, the Tm of which, as measured according to ISO 11357-3: 2013, is greater than 160° C., in particular greater than 170° C., more than 15% and up to 50% of impact modifier,
or predominantly comprising:
a long-chain semi-crystalline polyamide thermoplastic polymer, the Tm of which, as measured according to ISO 11357-3: 2013, is greater than 160° C., in particular greater than 170° C.,
up to 50% by weight of impact modifier, especially up to less than 15% by weight of impact modifier, in particular up to 12% by weight of impact modifier relative to the total weight of the composition,
up to 3% by weight of plasticizer relative to the total weight of the composition, said innermost composite reinforcement layer (2) being wound around said sealing layer (1),
and at least one of said composite reinforcement layers consisting of a fibrous material in the form of continuous fibers, which is impregnated with a composition predominantly comprising at least one polymer P1j, j=1 to m, m being the number of reinforcing layers, in particular an epoxy resin or an epoxy-based resin.

PVDF corresponds to polyvinylidene fluoride.

EVOH corresponds to ethylene vinyl alcohol.

Advantageously, the Tm of the short-chain polyamide thermoplastic polymer, as measured according to ISO 11357-3: 2013, is greater than 200° C.

The inventors therefore found, unexpectedly, that the use of two short-chain semi-crystalline polyamide thermoplastic polymers which are heavily impact-modified, or long-chain semi-crystalline polyamide thermoplastic polymers comprising a limited proportion of impact modifier and of plasticizer above and below a barrier layer, for the sealing layer, with a different polymer for the matrix of the composite, and especially an epoxy resin or epoxy-based resin, said composite being wound around the sealing layer, made it possible to obtain a structure suitable for transporting, distributing or storing hydrogen and especially an increase in the maximum temperature of use which can extend up to 120° C., thus making it possible to increase the filling speed of the tanks.

"Multilayer structure" should be understood to mean a tank comprising or consisting of several layers, namely a sealing layer comprising at least three layers and at least one reinforcement layer, in particular a single reinforcement layer.

The multilayer structure is therefore understood to exclude a pipe or a tube.

The tank may be a tank for the mobile storage of hydrogen, that is on a truck for transporting hydrogen, on a car for transporting hydrogen and for supplying a fuel cell with hydrogen, for example, on a train for supplying hydrogen or on a drone for supplying hydrogen, but it can also be a tank for the stationary storage of hydrogen in a station for distributing hydrogen to vehicles.

In a first variant, said short-chain or long-chain polyamide thermoplastic polymer of layer (a) excludes a polyether block amide (PEBA).

Polyether block amides (PEBAs) are copolymers with amide units (Ba1) and polyether units (Ba2), said amide unit (Ba1) corresponding to an aliphatic repeating unit chosen from a unit obtained from at least one amino acid or a unit obtained from at least one lactam, or a unit X.Y obtained from the polycondensation:
of at least one diamine, said diamine preferentially being chosen from a linear or branched aliphatic diamine or a mixture thereof, and
of at least one carboxylic diacid, said diacid preferentially being chosen from:
a linear or branched aliphatic diacid, or a mixture thereof, said diamine and said diacid comprising 4 to 36 carbon atoms, advantageously 6 to 18 carbon atoms;
said polyether units (Ba2) being especially derived from at least one polyalkylene ether polyol, especially a polyalkylene ether diol.

In a second variant, said composition of layer (a) is devoid of nucleating agent.

Nucleating agents are known to those skilled in the art and the term refers to a substance which, when incorporated into a polymer, forms nuclei for the growth of crystals in the molten polymer.

They may be selected for example from microtalc, carbon black, silica, titanium dioxide and nanoclays.

In a third variant, said short-chain or long-chain polyamide thermoplastic polymer of layer (a) excludes a polyether block amide (PEBA) and said composition of layer (a) is devoid of nucleating agent.

In a fourth variant, said short-chain or long-chain polyamide thermoplastic polymer of layer (b) excludes a polyether block amide (PEBA).

In a fifth variant, said composition of layer (b) is devoid of nucleating agent.

In a sixth variant, said short-chain or long-chain polyamide thermoplastic polymer of layer (b) excludes a polyether block amide (PEBA) and said composition of layer (b) is devoid of nucleating agent.

In a seventh variant, said short-chain or long-chain polyamide thermoplastic polymer of layer (a) and of layer (b) excludes a polyether block amide (PEBA).

In an eighth variant, said composition of layer (a) and of layer (b) is devoid of nucleating agent.

In a ninth variant, said short-chain or long-chain polyamide thermoplastic polymer of layer (a) and of layer (b) excludes a polyether block amide (PEBA) and said composition of layer (a) and of layer (b) is devoid of nucleating agent.

In one embodiment, said multilayer structure consists of a sealing layer and a reinforcement layer.

Advantageously, the sealing layer (1) is leaktight to hydrogen at 23° C., that is the permeability to hydrogen at 23° C. is less than 500 cc.mm/m2.24h.atm at 23° C. under 0% relative humidity (RH).

In one embodiment, PA11 is excluded from the composition of layer (a).

In one embodiment, PA11 is excluded from the composition of layer (b).

In one embodiment, PA11 is excluded from the composition of layer (a) and the composition of layer (b).

The composite reinforcement layer(s) is (are) wound around the sealing layer by means of ribbons (or tapes or rovings) of fibers impregnated with polymer, which are deposited for example by filament winding.

When several reinforcement layers are present, the polymers are different.

When the polymers of the reinforcement layers are identical, several layers may be present, but advantageously a single reinforcement layer is present which then has at least one full winding around the sealing layer.

This entirely automatic process which is well known to those skilled in the art makes it possible, layer by layer, to select the winding angles which will afford the final structure its ability to withstand internal pressure loading.

When only one sealing layer and a composite reinforcement layer are present, thus leading to a two-layer multilayer structure (the sealing layer being considered as a single layer), then these two layers can adhere to one another, in direct contact with one another, especially because of the winding of the composite reinforcement layer over the sealing layer.

When several composite reinforcement layers are present, then the outermost layer (b) of said sealing layer, and therefore the one which is opposite the layer in contact with the hydrogen, may or may not adhere to the innermost layer of said composite reinforcement layers.

The other composite reinforcement layers also may or may not adhere to one another.

The other sealing layers also may or may not adhere to one another.

Advantageously, only one sealing layer and one reinforcement layer are present, and do not adhere to one another.

Advantageously, only one sealing layer and one reinforcement layer are present, and do not adhere to one another and the reinforcement layer consists of a fibrous material in the form of continuous fibers, which is impregnated with a composition predominantly comprising at least one polymer P1j, in particular an epoxy resin or an epoxy-based resin.

In one embodiment, only one sealing layer and one reinforcement layer are present, and do not adhere to one another, and the reinforcement layer consists of a fibrous material in the form of continuous fibers, which is impregnated with a composition predominantly comprising a polymer P1j which is an epoxy resin or an epoxy-based resin.

The expression "epoxy-based" throughout the description means that the epoxy represents at least 50% by weight of the matrix.

Regarding the Sealing Layer and the Thermoplastic Polymers of Layers (a) and (b)

Each of said layers (a) and (b) consists of a composition predominantly comprising at least one short-chain semi-crystalline polyamide thermoplastic polymer or a long-chain semi-crystalline polyamide thermoplastic polymer.

The expression "short-chain" means that the polyamide has a number of carbon atoms per nitrogen atom of from 4 to less than 8, in particular from 6 to less than 8.

The expression "long-chain" means that the polyamide has a number of carbon atoms per nitrogen atom of greater than or equal to 8, preferably greater than 9, in particular greater than 10.

The term "predominantly" means that said at least one polymer is present at more than 50% by weight relative to the total weight of the composition.

Advantageously, said at least one predominant polymer is present at more than 60% by weight, especially at more than 70% by weight, particularly at more than 80% by weight, more particularly greater than or equal to 90% by weight, relative to the total weight of the composition.

Said composition of layer (a) when the polyamide is long-chain can also comprise up to 50% by weight, relative to the total weight of the composition of impact modifiers and/or up to 3% by weight of plasticizer and/or up to 5% of additives.

The additives may be selected from another polymer, an antioxidant, a heat stabilizer, a UV absorber, a light stabilizer, a lubricant, an inorganic filler, a flame retardant, a dye, carbon black and carbonaceous nanofillers, with the exception of a nucleating agent; in particular, the additives are selected from an antioxidant, a heat stabilizer, a UV absorber, a light stabilizer, a lubricant, an inorganic filler, a flame retardant, a dye, carbon black and carbonaceous nanofillers, with the exception of a nucleating agent.

Said other polymer may be another semi-crystalline thermoplastic polymer or a different polymer and especially an EVOH (Ethylene vinyl alcohol).

Advantageously, said composition of layer (a) predominantly comprises said long-chain polyamide thermoplastic polymer, from 0 to 50% by weight of impact modifier, especially from 0 to less than 15% of impact modifier, in particular from 0 to 12% of impact modifier, from 0 to 3% of plasticizer and from 0 to 5% by weight of additives, the sum of the constituents of the composition being equal to 100%.

Advantageously, said composition of layer (a) predominantly consists of said long-chain polyamide thermoplastic polymer, from 0 to 50% by weight of impact modifier, especially from 0 to less than 15% of impact modifier, in particular from 0 to 12% of impact modifier, from 0 to 3% of plasticizer and from 0 to 5% by weight of additives, the sum of the constituents of the composition being equal to 100%.

In one embodiment, a single predominant polymer is present in the sealing layer.

In one embodiment, said composition of layer (a) comprises an impact modifier of 0.1 to 50% by weight, especially from 0.1 to less than 15% by weight, in particular from 0.1 to 12% by weight of impact modifier relative to the total weight of the composition.

In one embodiment, said composition of layer (a) is devoid of plasticizer.

In another embodiment, said composition of layer (a) comprises an impact modifier of 0.1 to 50% by weight, especially from 0.1 to less than 15% by weight, in particular from 0.1 to 12% by weight of impact modifier, and said composition of layer (a) is devoid of plasticizer relative to the total weight of the composition.

In yet another embodiment, said composition of layer (a) comprises an impact modifier of 0.1 to 50% by weight, especially from 0.1 to less than 15% by weight, and of 0.1 to 1.5% by weight of plasticizer relative to the total weight of the composition.

Said composition of layer (a) when the polyamide is short-chain also comprises more than 15% by weight and up to 50% by weight of impact modifier relative to the total weight of the composition, and/or up to 3% by weight of plasticizer and/or up to 5% of additives.

The additives may be selected from another polymer, an antioxidant, a heat stabilizer, a UV absorber, a light stabilizer, a lubricant, an inorganic filler, a flame retardant, a dye, carbon black and carbonaceous nanofillers, with the exception of a nucleating agent; in particular, the additives are selected from an antioxidant, a heat stabilizer, a UV absorber, a light stabilizer, a lubricant, an inorganic filler, a flame retardant, a dye, carbon black and carbonaceous nanofillers, with the exception of a nucleating agent.

Said other polymer may be another semi-crystalline thermoplastic polymer or a different polymer and especially an EVOH (Ethylene vinyl alcohol).

Advantageously, said composition of layer (a) predominantly comprises said short-chain polyamide thermoplastic polymer, from more than 15% to 50% by weight of impact modifier, especially from 20% by weight to 50% of impact modifier, in particular from 30% by weight to 40% by weight of impact modifier, from 0 to 3% of plasticizer and from 0 to 5% by weight of additives, the sum of the constituents of the composition being equal to 100%.

Advantageously, said composition of layer (a) predominantly consists of said short-chain polyamide thermoplastic polymer, from more than 15% to 50% by weight of impact modifier, especially from 20% by weight to 50% of impact modifier, from 0 to 3% of plasticizer and from 0 to 5% by weight of additives, the sum of the constituents of the composition being equal to 100%.

In one embodiment, a single predominant polymer is present in the sealing layer.

In one embodiment, said composition of layer (a) comprises an impact modifier from more than 15% to 50% by weight of impact modifier, especially from 20% by weight to 50% of impact modifier, relative to the total weight of the composition.

In one embodiment, said composition of layer (a) is devoid of plasticizer.

In another embodiment, said composition of layer (a) comprises an impact modifier of 0.1 to 50% by weight, especially from 0.1 to less than 15% by weight, in particular from 0.1 to 12% by weight of impact modifier, and said composition of layer (a) is devoid of plasticizer relative to the total weight of the composition.

In yet another embodiment, said composition of layer (a) comprises an impact modifier of 0.1 to 50% by weight, especially from 0.1 to less than 15% by weight, and of 0.1 to 1.5% by weight of plasticizer relative to the total weight of the composition.

Regarding layer (b), it has the same characteristics as detailed above for layer (a), whether regarding the short-chain polyamide or long-chain polyamide.

The polyamide of layer (a) and that of layer (b) may be identical or different; in particular, they are identical.

Short-Chain and Long-Chain Semi-Crystalline Polyamide Thermoplastic Polymer

"Polyamide thermoplastic polymer" or "semi-crystalline polyamide thermoplastic polymer" refers to a material that is generally solid at ambient temperature, and which softens during a temperature increase, in particular after passing its glass transition temperature (Tg), and may exhibit precise melting upon passing what is referred to as its melting point (Tm), and which becomes solid again when the temperature decreases below its crystallization temperature.

The Tg, the Tc and the Tm are determined by differential scanning calorimetry (DSC) according to standards 11357-2:2013 and 11357-3:2013, respectively.

The number-average molecular weight Mn of said semi-crystalline polyamide thermoplastic polymer is preferably in a range extending from 10,000 to 85,000, especially from 10,000 to 60,000, preferentially from 10,000 to 50,000, even more preferentially from 12,000 to 50,000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the skilled person.

The polyamide may be a homopolyamide or a co-polyamide or a mixture thereof.

In one embodiment, said thermoplastic polymer is a long-chain aliphatic polyamide, that is a polyamide having an average number of carbon atoms per nitrogen atom of greater than or equal to 8, preferably greater than 9, in particular greater than 10.

In particular, the long-chain aliphatic polyamide is selected from:
polyamide 11 (PA11), polyamide 12 (PA12), polyamide 1010 (PA1010), polyamide 1012 (PA1012), polyamide 1212 (PA1012), or a mixture thereof or a copolyamide thereof, in particular PA11 and PA12.

More particularly, polyamide 11 (PA11), polyamide 12 (PA12), polyamide 1012 (PA1012), polyamide 1212 (PA1012), ora mixture thereof or a copolyamide thereof, in particular PA11 and PA12.

In one embodiment, the long-chain aliphatic polyamide is selected from:
polyamide 12 (PA12), polyamide 1010 (PA1010), polyamide 1012 (PA1012), polyamide 1212 (PA1012), or a mixture thereof or a copolyamide thereof, in particular PA12.

In another embodiment, the long-chain aliphatic polyamide is selected from:
polyamide 12 (PA12), polyamide 1012 (PA1012), polyamide 1212 (PA1012), or a mixture thereof or a copolyamide thereof, in particular PA12.

In one embodiment, said thermoplastic polymer is a short-chain aliphatic polyamide, that is a polyamide having a number of carbon atoms per nitrogen atom of from 4 to less than 8, in particular from 6 to less than 8.

In particular, the short-chain aliphatic polyamide is selected from PA6, PA66 and PA6/66.

In the event that welding is necessary, there are various methods making it possible to weld elements made of polyamide thermoplastic polymer. Thus, contact or contactless heating blades, ultrasound, infrared, vibrations, rotation of one element to be welded against the other or even laser welding may be used.

Regarding the Impact Modifier

The impact modifier may be any impact modifier as long as it is a polymer having a modulus below that of the resin, having good adhesion to the matrix, so as to dissipate cracking energy.

The impact modifier advantageously consists of a polymer having a flexural modulus below 100 MPa measured according to standard ISO 178 and a Tg below 0° C.

(measured according to standard 11357-2 at the inflection point of the DSC thermogram), in particular a polyolefin.

In one embodiment, PEBAs are excluded from the definition of impact modifiers.

The polyolefin of the impact modifier may be functionalized or non-functionalized or be a mixture of at least one functionalized polyolefin and/or at least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. By way of example, mention may be made of:

the homopolymers and copolymers of polyethylene, particularly LDPE, HDPE, LLDPE (linear low-density polyethylene), VLDPE (very low density polyethylene) and metallocene polyethylene.

homopolymers or copolymers of propylene.

ethylene/alpha-olefin copolymers such as ethylene/propylene, EPRs (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) may be a polymer of alpha-olefins having reactive units (functionalities); such reactive units are acid, anhydride, or epoxy functions. By way of example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or even by carboxylic acid anhydrides such as maleic anhydride. A functionalized polyolefin is for example a PE/EPR mixture, the ratio by weight whereof can vary widely, for example between 40/60 and 90/10, said mixture being co-grafted with an anhydride, especially maleic anhydride, according to a graft rate for example of 0.01 to 5% by weight.

The functionalized polyolefin (B1) may be chosen from the following, maleic anhydride or glycidyl methacrylate grafted, (co)polymers wherein the graft rate is for example from 0.01 to 5% by weight:

of PE, of PP, of copolymers of ethylene with propylene, butene, hexene, or octene containing for example from 35 to 80% by weight of ethylene;

ethylene/alpha-olefin copolymers such as ethylene/propylene, EPRs (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

ethylene and vinyl acetate copolymers (EVA), containing up to 40% by weight of vinyl acetate;

ethylene and alkyl (meth)acrylate copolymers, containing up to 40% by weight of alkyl (meth)acrylate;

ethylene and vinyl acetate (EVA) and alkyl (meth)acrylate copolymers, containing up to 40% by weight of comonomers.

The functionalized polyolefin (B1) may also be selected from ethylene/propylene copolymers with predominantly maleic anhydride grafted propylene condensed with a monoamine polyamide (or a polyamide oligomer) (products described in EP-A-0,342,066).

The functionalized polyolefin (B1) may also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and may be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, the index MFI, the density of these polyolefins may also vary widely, which the person skilled in the art will know. MFI, abbreviation for Melt Flow Index, is a measure of fluidity in the molten state. It is measured according to standard ASTM 1238.

Advantageously the non-functionalized polyolefins (B2) are selected from homopolymers or copolymers of polypropylene and any ethylene homopolymer or ethylene copolymer and a higher alpha-olefin comonomer such as butene, hexene, octene or 4-methyl-1-pentene. Mention may be made for example of PPs, high-density PEs, medium-density PEs, linear low-density PEs, low-density PEs, very low-density PEs. These polyethylenes are known by the person skilled in the art as being produced according to a "free-radical" method, according to a "Ziegler" catalysis method, or, more recently, a "metallocene" catalysis.

Advantageously the functionalized polyolefins (B1) are chosen from any polymer comprising alpha-olefin units and units carrying polar reactive functions like epoxy, carboxylic acid or carboxylic acid anhydride functions. By way of examples of such polymers, mention may be made of terpolymers of ethylene, of alkyl acrylate and of maleic anhydride or of glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Advantageously, said composition constituting said sealing layer(s) is devoid of polyether block amide (PEBA). In this embodiment, PEBAs are therefore excluded from impact modifiers.

Advantageously, said transparent composition is devoid of core-shell particles or core-shell polymers.

Core-shell particle must be understood as a particle whose first layer forms the core and the second or all following layers form the respective shells.

The core-shell particle may be obtained by a method with several steps comprising at least two steps. Such a method is described for example in documents US2009/0149600 or EP0,722,961.

Regarding the Plasticizer

The plasticizer may be a plasticizer commonly used in compositions based on polyamide(s).

Advantageously, use is made of a plasticizer which has good thermal stability so that it does not form fumes during the steps of mixing the different polymers and transforming the composition obtained.

In particular, this plasticizer may be selected from:
benzenesulfonamide derivatives, such as n-butyl benzenesulfonamide (BBSA), the ortho and para isomers of ethyl toluenesulfonamide (ETSA), N-cyclohexyl toluenesulfonamide and N-(2-hydroxypropyl)benzenesulfonamide (HP-BSA),
esters of hydroxybenzoic acids, such as 2-ethylhexyl para-hydroxybenzoate (EHPB) and 2-decylhexyl para-hydroxybenzoate (HDPB),
esters or ethers of tetrahydrofurfuryl alcohol, such as oligo-ethyleneoxytetrahydrofurfuryl alcohol, and
esters of citric acid or hydroxymalonic acid, such as oligo-ethyleneoxymalonate.

A preferred plasticizer is n-butyl benzenesulfonamide (BBSA).

Another more particularly preferred plasticizer is N-(2-hydroxypropyl)benzenesulfonamide (HP-BSA). Indeed, the latter has the advantage of preventing the formation of deposits at the extrusion screw and/or die ("die drool") during a step of transformation by extrusion.

Of course, it is possible to use a mixture of plasticizers.

Regarding the Composite Reinforcement Layer and the Polymer P1j

The polymer P1j can be a thermoplastic polymer or a thermoset polymer.

One or more composite reinforcement layers may be present.

Each of the said layers consists of a fibrous material in the form of continuous fibers impregnated with a composition predominantly comprising at least one thermoplastic polymer P1j, j corresponding to the number of layers present.

j is comprised from 1 to 10, in particular from 1 to 5, especially from 1 to 3, preferentially j=1.

The term "predominantly" means that said at least one polymer is present at more than 50% by weight relative to the total weight of the composition and of the matrix of the composite.

Advantageously, said at least one predominant polymer is present at more than 60% by weight, especially at more than 70% by weight, particularly at more than 80% by weight, more particularly greater than or equal to 90% by weight, relative to the total weight of the composition.

Said composition may further comprise impact modifiers and/or additives.

The additives may be selected from an antioxidant, a heat stabilizer, a UV absorber, a light stabilizer, a lubricant, an inorganic filler, a flame retardant, a plasticizer and a dye, with the exception of a nucleating agent.

Advantageously, said composition predominantly consists of said thermoplastic polymer P1j, from 0 to 15% by weight of impact modifier, in particular from 0 to 12% by weight of impact modifier, from 0 to 5% by weight of additives, the sum of the constituents of the composition being equal to 100% by weight.

Said at least one predominant polymer in each layer may be the same or different.

In one embodiment, a single predominant polymer is present at least in the composite reinforcement layer and does not adhere to the sealing layer.

In one embodiment, each reinforcement layer comprises the same type of polymer, in particular an epoxy resin or epoxy-based resin.

POLYMER P1j

Thermoplastic Polymer P1j

Thermoplastic, or thermoplastic polymer, refers to a material that is generally solid at ambient temperature, which may be semi-crystalline or amorphous, in particular semi-crystalline, and that softens during a temperature increase, in particular after passing its glass transition temperature (Tg) and flows at a higher temperature when it is amorphous, or that may exhibit a sharp transition upon passing its so-called melting point (Tm) when it is semi-crystalline, and which becomes solid again when the temperature decreases below its crystallization temperature Tc, (for a semi-crystalline) and below its glass transition temperature (for an amorphous).

The Tg, Tc, and Tm are determined by differential scanning calorimetry (DSC) according to standard 11357-2:2013 and 11357-3:2013, respectively.

The number-average molecular weight Mn of said thermoplastic polymer is preferably in a range extending from 10,000 to 40,000, preferably from 10,000 to 30,000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

As examples of semi-crystalline thermoplastic polymers which are suitable in the present invention, mention may be made of:
polyamides, in particular comprising an aromatic and/or cycloaliphatic structure,
including copolymers, for example polyamide-polyether copolymers, polyesters,
polyaryletherketones (PAEK),
polyetheretherketones (PEEK),polyetherketoneketones (PEKK),
polyetherketone etherketone ketones (PEKEKK),
polyimides in particular polyetherimides (PEI) or polyamide-imides,
polylsulfones (PSU) in particular polyarylsulfones such as
polyphenylsulfones (PPSU),
polyethersulfones (PES).

semi-crystalline polymers are particularly preferred, and in particular polyamides and their semi-crystalline copolymers.

The nomenclature used to define the polyamides is described in ISO standard 1874-1:2011 "Plastiques—Matériaux polyamides (PA) pour moulage et extrusion—Partie 1: Désignation", in particular on page 3 (Tables 1 and 2) and is well known to the skilled person.

The polyamide may be a homopolyamide or a co-polyamide or a mixture thereof.

Advantageously, the semi-crystalline polyamides are semi-aromatic polyamide, especially a semi-aromatic polyamide of formula X/YAr, as described in EP1505099, particularly a semi-aromatic polyamide of formula A/XT wherein A is selected from a unit obtained from an amino acid, a unit obtained from a lactam and a unit corresponding to the formula (Ca diamine).(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;

X.T denotes a unit obtained from the polycondensation of a Cx diamine and terephthalic acid, with x representing the number of carbon atoms of the Cx diamine, x being between 5 and 36, advantageously between 9 and 18, especially a polyamide with formula A/5T, A/6T, A/9T, A/10T, or A/11T, A being as defined above, in particular a polyamide chosen from among a PA MPMDT/6T, a PA11/10T, a PA 5T/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, an 11/5T/10T.

T corresponds to terephthalic acid, MXD corresponds to m-xylylene diamine, MPMD corresponds to methylpentamethylene diamine and BAC corresponds to bis(aminomethyl)cyclohexane. Said semi-aromatic polyamides defined above especially have a Tg of greater than or equal to 80° C.

Thermoset Polymer P1j

The thermoset polymers are selected from epoxy resins or epoxy-based resins, polyesters, vinyl esters and polyurethanes, or a mixture thereof, in particular epoxy resins or epoxy-based resins.

Advantageously, each composite reinforcement layer consists of a composition comprising the same type of polymer, in particular an epoxy resin or epoxy-based resin.

Said composition comprising said polymer P1j can be transparent to radiation suitable for welding.

In another embodiment, the composite reinforcement layer is wound around the sealing layer in the absence of any subsequent welding.

Regarding the Binder

The binder may be an adhesive composition as described in EP2098580, that is an adhesive composition comprising:
at least one polyamide denoted A having an average number of carbon atoms per nitrogen atom denoted CA between 4 and 8.5, advantageously between 4 and 7;
at least one polyamide denoted B having a melting point greater than or equal to 180° C. and an average number of carbon atoms per nitrogen atom denoted CB between 7 and 10, advantageously between 7.5 and 9.5;
at least one polyamide denoted C having an average number of carbon atoms per nitrogen atom denoted CC between 9 and 18, advantageously between 10 and 18;
at least 50% by weight of said composition being formed of one or more polyamides selected from the polyamides A, B and C,
the weighted average mass of the melting enthalpies of these polyamides inside said composition being greater than 25 J/g (DSC),
the average number of carbon atoms per nitrogen atom of the polyamides A, B and C further satisfying the following strict inequation: CA<CB<CC.

The binder may also be, for example, but without being limited thereto, a composition based on 50% of copolyamide 6/12 (ratio of 70/30 by weight) with an Mn of 16,000, and 50% of copolyamide 6/12 (ratio of 30/70 by weight) with an Mn of 16,000, a composition based on PP (polypropylene) grafter with maleic anhydride, known under the name of Admer QF551A from Mitsui, a composition based on PA610 (with an Mn of 30,000, and as otherwise defined) and 36% of PA6 (with an Mn of 28,000) and 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba), a composition based on PA612 (with an Mn of 29,000, and as otherwise defined) and 36% of PA6 (with an Mn of 28,000, and as otherwise defined) and 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba), a composition based on PA610 (with an Mn of 30,000, and as otherwise defined) and of 36% of PA12 (with an Mn of 35,000, and as otherwise defined) and of 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba), a composition based on 40% PA6 (with an Mn of 28,000, and as otherwise defined), of 40% of PA12(with an Mn of 35,000, and as otherwise defined) and of 20% of functionalized EPR Exxelor VA1801 (from Exxon) and of 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba) or else a composition based on 40% PA6.10 (with an Mn of 30,000, and as otherwise defined), of 40% of PA6 (with an Mn of 28,000, and as otherwise defined) and of 20% of impact modifier, of the type ethylene/ethyl acrylate/anhydride in a weight ratio of 68.5/30/1.5 (MFI 6 at 190° C. under 2.16 kg), and of 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba).

Regarding the Barrier Layer

The expression "barrier layer" denotes a layer having characteristics of low permeability and good resistance to hydrogen, that is the barrier layer slows the passage of hydrogen into the other layers of the structure or even to the outside of the structure. The barrier layer is therefore a layer which first and foremost makes it possible to not lose too much hydrogen to the atmosphere by diffusion, thus making it possible to avoid problems of explosion and combustion.

These barrier materials may be low-carbon polyamides, that is in which the average number of carbon atoms (C) relative to the nitrogen atom (N) is less than 9, preferably semi-crystalline and having a high melting point, polyphthalamides and/or also non-polyamide barrier materials such as highly crystalline polymers such as the copolymer of ethylene and vinyl alcohol (hereinafter denoted EVOH), or even functionalized fluorinated materials such as functionalized polyvinylidene fluoride (PVDF), the functionalized copolymer of ethylene and tetrafluoroethylene (ETFE), the functionalized copolymer of ethylene, tetrafluoroethylene and hexafluoropropylene (EFEP), functionalized polyphenylene sulfide (PPS), functionalized polybutylene naphthalate (PBN). If these polymers are not functionalized, then an intermediate binder layer can be added in order to provide good adhesion within the MLT structure.

Among these barrier materials, EVOHs are particularly beneficial, especially those which are richest in vinyl alcohol comonomer and also those which are impact-modified, since they make it possible to produce less brittle structures.

In other words, the expression "barrier layer" means that said barrier layer is highly impermeable to hydrogen; in particular, the permeability to hydrogen at 23° C. is less than 75 cc.mm/m2.24h.atm at 23° C. under 0% relative humidity (RH).

The permeability can also be expressed in (cc.mm/m$^2$.24h.Pa).

The permeability must then be multiplied by 101325.

Regarding the Structure

Said multilayer structure therefore comprises a sealing layer and at least one composite reinforcement layer which is wound around the sealing layer and which may or may not adhere to one another.

Advantageously, said sealing layer and reinforcement layer do not adhere to one another and consist of compositions which respectively comprise different polymers.

Nevertheless, said different polymers may be of the same type.

Thus, since the sealing layer consists of a composition comprising an aliphatic polyamide, then the composite reinforcement layer consists of a composition comprising an aliphatic polyamide different from that of the sealing layer (for example PA11 for the sealing layer and PA12 for the reinforcement layer, or vice-versa) or the composite reinforcement layer consists of a composition comprising a polyamide which is not aliphatic and which is for example a semi-aromatic polyamide, so as to position a high-Tg polymer as the matrix of the composite reinforcement.

In one embodiment, the sealing layer comprises, from the inside to the outside: layer (a), optionally a layer of binder, the barrier layer, optionally a layer of binder, and layer (b).

The layers of binder may be identical or different.

In one embodiment, the sealing layer comprises, from the inside to the outside: layer (a), the barrier layer, a layer of binder, and layer (b).

In one embodiment, the sealing layer comprises, from the inside to the outside: layer (a), a layer of binder, the barrier layer, optionally a layer of binder, and layer (b).

In one embodiment, the sealing layer comprises, from the inside to the outside: layer (a), a layer of binder, the barrier layer, and layer (b).

In one embodiment, the sealing layer comprises, from the inside to the outside: layer (a), optionally a layer of binder, the barrier layer, a layer of binder, and layer (b).

In one embodiment, the sealing layer comprises, from the inside to the outside: layer (a), the barrier layer, a layer of binder, and layer (b).

In one embodiment, the sealing layer comprises, from the inside to the outside: layer (a), a layer of binder, the barrier layer, a layer of binder, and layer (b).

The sealing layer may comprise one or more other layers, consisting of a thermoplastic polymer, below layer (a), and one or more other layers, consisting of a thermoplastic polymer, above layer (b).

In one embodiment, the sealing layer consists, from the inside to the outside, of: layer (a), the barrier layer, a layer of binder, and layer (b).

In one embodiment, the sealing layer consists, from the inside to the outside, of: layer (a), a layer of binder, the barrier layer, optionally a layer of binder, and layer (b).

In one embodiment, the sealing layer consists, from the inside to the outside, of: layer (a), a layer of binder, the barrier layer, and layer (b).

In one embodiment, the sealing layer consists, from the inside to the outside, of: layer (a), optionally a layer of binder, the barrier layer, a layer of binder, and layer (b).

In one embodiment, the sealing layer consists, from the inside to the outside, of: layer (a), the barrier layer, a layer of binder, and layer (b).

In one embodiment, the sealing layer consists, from the inside to the outside, of: layer (a), a layer of binder, the barrier layer, a layer of binder, and layer (b).

Said multilayer structure can comprise up to 10 composite reinforcement layers of different natures.

Advantageously, said multilayer structure comprises one, two, three, four, five, six, seven, eight, nine or ten composite reinforcement layers.

Advantageously, said multilayer structure comprises one, two, three, four or five composite reinforcement layers.

Advantageously, said multilayer structure comprises one, two or three composite reinforcement layers.

Advantageously, they consist of compositions which respectively comprise identical polymers.

Advantageously, they consist of compositions which respectively comprise polymers of the same type.

Advantageously, they consist of compositions which respectively comprise different polymers.

In one embodiment, said multilayer structure comprises a sealing layer and several reinforcement layers, said reinforcement layer adjacent to the sealing layer being wound around said sealing layer and the other reinforcement layers being wound around the directly adjacent reinforcement layer.

In one advantageous embodiment, said multilayer structure comprises a single sealing layer and a single composite reinforcement layer, said reinforcement layer being wound around said sealing layer.

Advantageously, in this latter embodiment, said polyamide of layers (a) and/or (b) is a short-chain aliphatic polyamide, in particular selected from PA6, PA66 and PA6/66, or a long-chain aliphatic polyamide, in particular selected from PA1010, PA 1012, PA 1212, PA11 and PA12, especially PA11 and PA12, and said polymer P1j is an epoxy resin or epoxy-based resin.

Advantageously, in this latter embodiment, said polyamide of layers (a) and (b) is a short-chain aliphatic polyamide, in particular selected from PA6, PA66 and PA6/66, or a long-chain aliphatic polyamide, in particular selected from PA1010, PA 1012, PA 1212, PA11 and PA12, especially PA11 and PA12, and said polymer P1j is an epoxy resin or epoxy-based resin.

Advantageously, in this latter embodiment, said polyamide of layer (a) is a short-chain aliphatic polyamide, in particular selected from PA6, PA66 and PA6/66, and said polyamide of layer (b) is a long-chain aliphatic polyamide, in particular selected from PA1010, PA 1012, PA 1212, PA11 and PA12, especially PA11 and PA12, and said polymer P1j is an epoxy resin or epoxy-based resin.

Advantageously, in this latter embodiment, said polyamide of layer (a) is a long-chain aliphatic polyamide, in particular selected from PA1010, PA 1012, PA 1212, PA11 and PA12, especially PA11 and PA12, and said polyamide of layer (b) is a short-chain aliphatic polyamide, in particular selected from PA6, PA66 and PA6/66, and said polymer P1j is an epoxy resin or epoxy-based resin.

Advantageously, in this latter embodiment, said polyamide of layers (a) and/or (b) is a short-chain aliphatic polyamide, in particular selected from PA6, PA66 and PA6/66, or a long-chain aliphatic polyamide, in particular selected from PA1010, PA 1012, PA 1212, PA11 and PA12, especially PA11 and PA12, and said polymer P1j is a long-chain aliphatic polyamide, in particular selected from PA1010, PA 1012, PA 1212, PA11 and PA12, especially PA11 and PA12, or a semi-aromatic polyamide, in particular selected from 11/5T or 11/6T or 11/10T polyamide, MXDT/10T, MPMDT/10T and BACT/10T.

Advantageously, in this latter embodiment, said polyamide of layers (a) and (b) is a short-chain aliphatic polyamide, in particular selected from PA6, PA66 and PA6/66, or a long-chain aliphatic polyamide, in particular selected from PA1010, PA 1012, PA 1212, PA11 and PA12, especially PA11 and PA12, and said polymer P1j is a long-chain aliphatic polyamide, in particular selected from PA1010, PA 1012, PA 1212, PA11 and PA12, especially PA11 and PA12, or a semi-aromatic polyamide, in particular selected from 11/5T or 11/6T or 11/10T polyamide, MXDT/10T, MPMDT/10T and BACT/10T.

Advantageously, in this latter embodiment, said polyamide of layers (a) and/or (b) is a short-chain aliphatic polyamide, in particular selected from PA6, PA66 and PA6/66, and said polymer P1j is a long-chain aliphatic polyamide, in particular selected from PA1010, PA 1012, PA 1212, PA11 and PA12, especially PA11 and PA12, or a semi-aromatic polyamide, in particular selected from 11/5T or 11/6T or 11/10T polyamide, MXDT/10T, MPMDT/10T and BACT/10T.

Advantageously, in this latter embodiment, said polyamide of layers (a) and (b) is a long-chain aliphatic polyamide, in particular selected from PA1010, PA 1012, PA 1212, PA11 and PA12, especially PA11 and PA12, and said polymer P1j is a long-chain aliphatic polyamide, in particular selected from PA1010, PA 1012, PA 1212, PA11 and PA12, especially PA11 and PA12, or a semi-aromatic polyamide, in particular selected from 11/5T or 11/6T or 11/10T polyamide, MXDT/10T, MPMDT/10T and BACT/10T.

Advantageously, in this latter embodiment, said polyamide of layer (a) is a short-chain aliphatic polyamide, in particular selected from PA6, PA66 and PA6/66, and said polyamide of layer (b) is a long-chain aliphatic polyamide, in particular selected from PA1010, PA 1012, PA 1212, PA11 and PA12, especially PA11 and PA12, and said polymer P1j is a long-chain aliphatic polyamide, in particular selected from PA1010, PA 1012, PA 1212, PA11 and PA12, especially PA11 and PA12, or a semi-aromatic polyamide, in particular selected from 11/5T or 11/6T or 11/10T polyamide, MXDT/10T, MPMDT/10T and BACT/10T.

Advantageously, in this latter embodiment, said polyamide of layer (a) is a long-chain aliphatic polyamide, in particular selected from PA1010, PA 1012, PA 1212, PA11 and PA12, especially PA11 and PA12, and said polyamide of layer (b) is a short-chain aliphatic polyamide, in particular selected from PA6, PA66 and PA6/66, and said polymer P1j is a long-chain aliphatic polyamide, in particular selected from PA1010, PA 1012, PA 1212, PA11 and PA12, especially PA11 and PA12, ora semi-aromatic polyamide, in particular selected from 11/5T or 11/6T or 11/10T polyamide, MXDT/10T, MPMDT/10T and BACT/10T.

All combinations of these two layers are therefore within the scope of the invention, with the proviso that at least said innermost composite reinforcement layer is wound around said sealing layer, the other layers adhering to one another or not.

Advantageously, in said multilayer structure, each reinforcement layer consists of a composition comprising the same type of polymer P1j, in particular an epoxy resin or epoxy-based resin.

Advantageously, the polyamide P1j is identical for all the reinforcement layers.

Advantageously, said multilayer structure further comprises at least one outer layer consisting of a fibrous material made of continuous glass fibers, which is impregnated with a transparent amorphous polymer, said layer being the outermost layer of said multilayer structure.

Said outer layer is a second reinforcement layer, but transparent, which makes it possible to be able to place text on the structure.

Regarding the Fibrous Material

Regarding the fibers making up said fibrous material, they are in particular mineral, organic or plant fibers.

Advantageously, said fibrous material may be sized or unsized.

Said fibrous material can therefore comprise up to 3.5% by weight of an organic material (of thermoset or thermoplastic resin type), referred to as sizing.

The mineral fibers include carbon fibers, glass fibers, basalt or basalt-based fibers, silica fibers, or silicon carbide fibers, for example. The organic fibers include thermoplastic or thermosetting polymer-based fibers, such as semi-aromatic polyamide fiber, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer matrix constituting the pre-impregnation matrix when the latter is semi-crystalline. Advantageously, they are semi-crystalline thermoplastic polymer-based and have a melting point Tm higher than the Tg of the polymer or thermoplastic polymer mixture constituting the pre-impregnation matrix when the latter is amorphous, or higher than the Tm of the polymer or thermoplastic polymer matrix mixture constituting the pre-impregnation matrix when the latter is semi-crystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material can also be a fabric, a braid or woven with fibers.

It may also correspond to fibers with support threads.

These component fibers may be used alone or in mixtures. Thus, organic fibers can be mixed with the mineral fibers to be pre-impregnated with thermoplastic polymer powder and to form the pre-impregnated fibrous material.

The organic fiber strands may have several grammages. They can further have several geometries. The component fibers of the fibrous material can further assume the form of a mixture of these reinforcing fibers with different geometries. The fibers are continuous fibers.

Preferably, the fibrous material is selected from glass fibers, carbon fibers, basalt fibers or basalt-based fibers, or a mixture thereof, in particular carbon fibers.

It is used in the form of one roving or several rovings.

According to another aspect, the present invention relates to a method for producing a multilayer structure as defined above, characterized in that it comprises a step of preparing the sealing layer by extrusion blow molding, rotational molding, injection molding and/or extrusion.

In one embodiment, said method for producing a multilayer structure comprises a step of filament winding of the reinforcement layer as defined above around the sealing layer as defined above.

All the characteristics detailed above also apply to the method.

EXAMPLES

Example 1: Permeability to hydrogen at 23° C. of PA11 liners and a liner of the invention was tested.

A 2 mm sealing layer (liner) having five layers according to the invention, constituting a tank of the invention, was obtained by extrusion blow molding at a temperature suited to the nature of the different thermoplastic resins used.

The liner has the following structure:

PA11//binder//EVOH//binder//PA11, the layers having the following respective thicknesses: (900 µm//50 µm//100 µm//50 µm//900 µm).

PA11 is a polyamide 11 having an Mn (number-average molecular weight) of 45,000. The melting point is 190° C.; its enthalpy of fusion is 56 kJ/m².

The binder is a Tieflex S442® sold by Arkema.

EVOH is an EVOH containing 32% ethylene, of EVAL FP101B type (from Eval)

In the event that a composite reinforcement made of epoxy resin or epoxy-based resin is wound over the liner, use is then made of a process of wet filament winding, which consists in winding fibers around the liner, which fibers have been previously pre-impregnated in a bath of liquid epoxy or a bath of epoxy-based liquid. The reservoir is then polymerized in an oven for 2 hours.

The permeability of a liner made of PA11 and a liner of the invention is measured according to a test which consists in flushing the upper face of a film made of PA11 or consisting of the five layers of the invention with the test gas (Hydrogen) and in measuring by gas chromatography the flow which diffuses through the film in the lower part, flushed by the vector gas: Nitrogen.

The experimental conditions are presented in Table 1:

TABLE 1

| Device | LYSSY GPM500/GC coupling |
| --- | --- |
| Detection | Chromatographic (TCD) |
| Column | Poraplot Q (L = 27.5 m, Dint = 0.530 mm, Ep.film = 20 µ) |
| Vector gas | NITROGEN |
| Diffusing gas | HYDROGEN U (H2) |
| Test surface area | 50 cm² |

TABLE 1-continued

| Device | LYSSY GPM500/GC coupling |
| --- | --- |
| Calibration | Absolute by direct injection through a septum |
| Pressure at column head | 18 psi |
| Oven temperature | Isothermal 30° C. |
| Detector temperature | 200° C. detector: TCD [−] |
| Injector temperature | Temperature of the lyssy injection loop |
| Temperature/relative humidity | 23° C./0% RH |

The results are presented in Table 2 and show that the liner of the invention has much lower permeability than that of a liner made of PA11.

TABLE 2

|  | PA11 liner (2 mm) | Liner of example 1 (2 mm) |
| --- | --- | --- |
| Permeability (cc.mm/m 2.24 h.atm) measured at 23° C. under 0% relative humidity (RH)) | 50 | 10 |

The permeability can also be expressed in (cc.mm/m².24h.Pa).

The permeability must then be multiplied by 101325.

The invention claimed is:

1. A multilayer structure intended for transporting, distributing, and storing hydrogen, comprising, from the inside to the outside, a sealing layer (1) and at least one composite reinforcement layer (2), said sealing layer comprising, from the inside to the outside:
   a layer (a) consisting of a composition, the composition comprising:
     (a1) at least 50% by weight of a short-chain aliphatic polyamide thermoplastic polymer, the Tm of which, as measured according to ISO 11357-3: 2013, is greater than 160° C., and
     (a2) more than 15% and up to 50% of impact modifier, or the composition comprising:
     (a1') at least 50% by weight of a long-chain semi-crystalline aliphatic polyamide thermoplastic polymer, the Tm of which, as measured according to ISO 11357-3: 2013, is greater than 160° C.,
     (a2') up to 50% by weight of impact modifier, relative to the total weight of the composition, and
     (a3') up to 3% by weight of plasticizer relative to the total weight of the composition;
   optionally, a layer of binder;
   a hydrogen barrier layer;
   optionally, a layer of binder;
   a layer (b) consisting of a composition, the composition comprising:
     (b1) at least 50% by weight of a short-chain aliphatic polyamide thermoplastic polymer, the Tm of which, as measured according to ISO 11357-3: 2013, is greater than 160° C., and
     (b2) more than 15% and up to 50% of impact modifier, or the compositing comprising:
     (b1') at least 50% by weight of a long-chain semi-crystalline aliphatic polyamide thermoplastic polymer, the Tm of which, as measured according to ISO 11357-3: 2013, is greater than 160° C., (b2') up to 50% by weight of impact modifier relative to the total weight of the composition, (b3') up to 3% by weight of plasticizer relative to the total weight of the composition, an innermost composite reinforcement layer (2) being wound around said sealing layer (1), and at least one of said composite reinforcement layers consisting of a fibrous material in the form of continuous fibers, which is impregnated with a composition predominantly comprising at least one polymer P1j, j=1 to m, m being the number of reinforcement layers.

2. The multilayer structure according to claim 1, wherein said layer (a) and said layer (b) comprise the same polyamide.

3. The multilayer structure according to claim 1, wherein said layer (a) and said layer (b) comprise a different polyamide.

4. The multilayer structure according to claim 1, wherein the polyamide of layers (a) and/or (b) is a long-chain aliphatic polyamide.

5. The multilayer structure according to claim 1, wherein the polyamide of layers (a) and/or (b) is a short-chain aliphatic polyamide.

6. The multilayer structure according to claim 1, wherein each reinforcement layer comprises the same polymer.

7. The multilayer structure according to claim 1, wherein it has a single reinforcement layer.

8. The multilayer structure according to claim 1, wherein said polymer P1j is PA1010, PA 1012, PA 1212, PA11, or PA12.

9. The multilayer structure according to claim 1, wherein said polymer P1j is an epoxy resin or epoxy-based resin.

10. The multilayer structure according to claim 1, wherein said multilayer structure consists of a single reinforcement layer and a sealing layer, in which said polymer P1j is an epoxy resin or epoxy-based resin.

11. The multilayer structure according to claim 1, wherein said multilayer structure consists of a single reinforcement layer and a sealing layer, in which said polymer P1j is a long-chain aliphatic polyamide or a semi-aromatic polyamide.

12. The multilayer structure according to claim 1, wherein the fibrous material of the composite reinforcement layer is selected from glass fibers, carbon fibers, basalt fibers or basalt-based fibers, or a mixture thereof.

13. The multilayer structure according to claim 1, wherein said structure further comprises at least one outer layer consisting of a fibrous material made of continuous glass fibers, which is impregnated with a transparent amorphous polymer, said layer being the outermost layer of said multilayer structure.

14. A method for producing a multilayer structure as defined in claim 1, wherein it comprises a step of preparing the sealing layer by extrusion blow molding, rotational molding, injection molding, or extrusion.

15. The method for producing a multilayer structure as defined in claim 14, wherein the method comprises a step of filament winding of the reinforcement layer around the sealing layer.

* * * * *